United States Patent
Weinand

[15] 3,656,227
[45] Apr. 18, 1972

[54] METHOD OF MAKING A MOLD FOR BIDIRECTIONAL HYDRODYNAMIC SHAFT SEALS

[72] Inventor: Louis H. Weinand, Warren, Mich.
[73] Assignee: General Motors Corporation, Detroit, Mich.
[22] Filed: Mar. 26, 1970
[21] Appl. No.: 22,978

[52] U.S. Cl. .................................... 29/530, 18/DIG. 47
[51] Int. Cl. .................................................. B23p 17/00
[58] Field of Search .............. 29/527.1, 530; 18/DIG. 47; 277/134

[56] References Cited

UNITED STATES PATENTS

| | | | |
|---|---|---|---|
| 3,276,115 | 10/1966 | Hansz | 29/527.1 |
| 3,497,225 | 2/1970 | Workman | 277/134 |
| 3,246,369 | 4/1966 | Rhoads et al. | 18/DIG. 47 |
| 3,276,114 | 10/1966 | Blaurock | 29/527.1 |
| 3,536,806 | 10/1970 | Jackson | 18/DIG. 47 |

Primary Examiner—J. Spencer Overholser
Assistant Examiner—John E. Roethel
Attorney—J. L. Carpenter, E. J. Biskup and P. D. Sachtjen

[57] ABSTRACT

A method of making a mold for bidirectional hydrodynamic shaft seals wherein the mold face for forming the air side wall of the seal includes a plurality of circumferentially spaced, wedge-shaped recesses formed by a grinding wheel. The recesses are inclined with respect to the mold face and establish projecting cylindrical pads on the molded seal, the side walls of which have arcuate shapes and define triangular, grooved areas therebetween. The bases of the side walls operatively engage the shaft to be sealed in a trapezoidal contact pattern so as to be alternately effective to unidirectionally return leaking fluid upon a reversal of shaft rotation.

1 Claims, 7 Drawing Figures

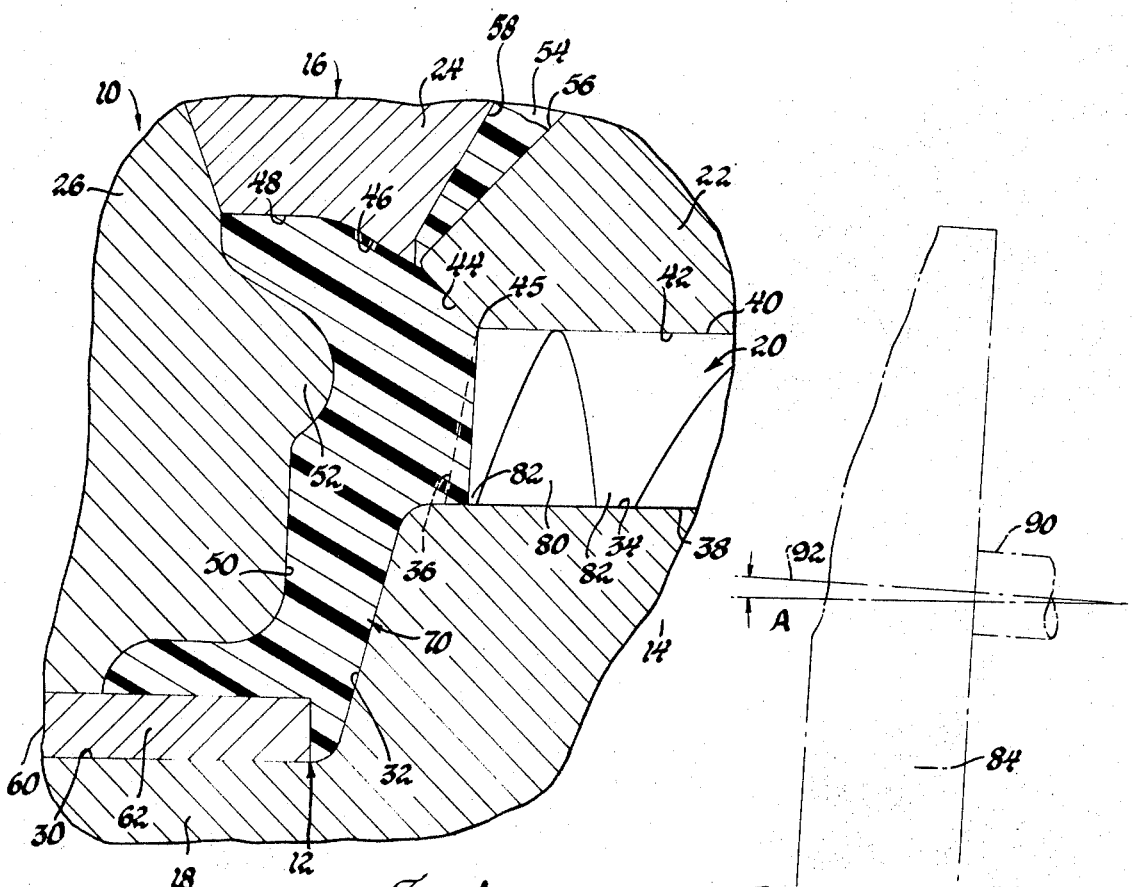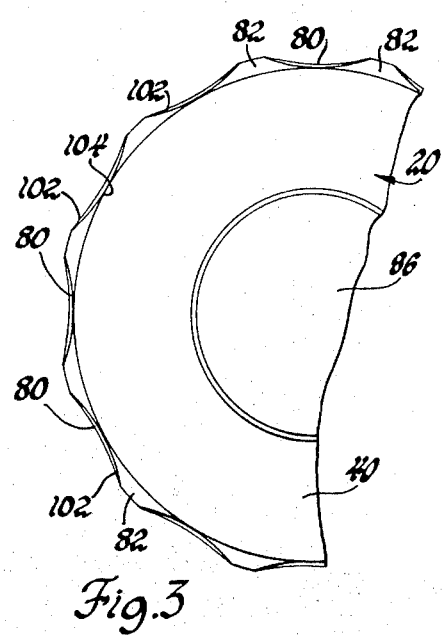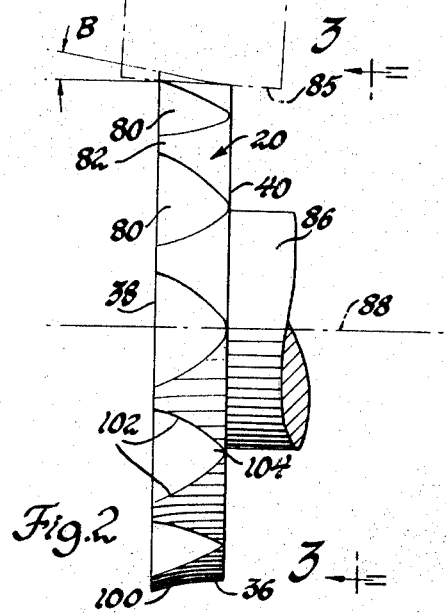

INVENTOR.
Louis H. Weinand
BY
Peter D. Sachtjen
ATTORNEY

METHOD OF MAKING A MOLD FOR BIDIRECTIONAL HYDRODYNAMIC SHAFT SEALS Recently, hydrodynamic seals have become available for positively sealing bidirectionally rotatable shafts. These bidirectional seals are of the type disclosed in my pending application, Ser. No. 577,236, filed on Sept. 6, 1966, now U.S. Pat. No. 3,515,395, and assigned to the assignee of the present invention wherein a surface on the air side of the seal is provided with a circumferentially alternating series of triangular pads and grooves. The pads project radially inwardly from the air side surface and establish pairs of converging walled surfaces. In assembly, the bases of the pads establish a series of wedge-shaped or trapezoidal patterns with the shaft. Fluid leaking past the lip of the seal is carried within the groove into contact with one of the walled surfaces which then functions as a hydrodynamic pump to displace the fluid across the lip to the reservoir. For the opposite direction of shaft rotation, the other walled surface is effective to return the leaking fluid.

Bidirectional hydrodynamic shaft seals of the aforementioned type have generally required specialized tooling and manufacturing techniques to form the portion of the mold which establishes bidirectional walled surfaces. Currently, numerous approaches have evolved for forming the alternating series of pads and grooves. In one method, an enlarged groove pattern is made and, by a follower cam operated milling wheel, the pattern is transferred to an engraved on the mold member used for forming the air side wall. In another method, an electro-chemical machining process is used to transfer the bidirectional contact pattern from a female pattern to the mold member to establish the desired series of pads and grooves. A further process utilizes photographic etching to form the pattern on the mold member. Those skilled in the art will appreciate that all of these processes require intermediate patterns and manufacturing steps, sophisticated tooling techniques, and expensive and complex machining. As such, each mold takes considerable time and effort to produce mold parts which will repetitively produce the required contact pattern on the mold element. In seals of this type which in many instances are specially designed for a particular application and environment, the cost attributable to these tooling operations constitutes a significant part of the article cost.

The present invention improves upon the above-mentioned techniques for the manufacture of bidirectional seals by providing a method for making bidirectional shaft seals in a considerably simplified manner. Generally, this method takes the form of directly grinding the mold member for the air side wall of the seal to form a plurality of cylindrical grooves which are mutually separated by triangular pads. The arcuate side walls between the grooves and pads terminate adjacent the edge of the mold member which forms the seal lip. Preferably, the grooves are formed by passing a grinding wheel across the conical face of the mold member at a shallow approach angle with respect to the axis of the seal. In the mold cavity, these grooves constitute cylindrical recesses into which the mold elastomer flows thereby forming, upon solidification, a circumferential inwardly projecting series of pads. Thus, each pad is in the form of a wedge-shaped, cylindrical segment having an axis lying in the same plane as the axis of the molded seal. In assembly, the bases of the arcuate side walls of the pads establish a trapezoidal contact pattern which is effective to unidirectionally pump leaking fluid in the manner described above.

Accordingly, an object of the present invention is to provide a simplified method for forming a bidirectional contact pattern on hydrodynamic seals.

Another object of the present invention is to provide a method for making a mold cavity for bidirectional hydrodynamic seals wherein a circumferential series of wedge-shaped recesses are formed by a grinding wheel in a mold face of the seal mold, the recesses forming a plurality of cylindrical pads on the molded article which project therefrom and engage a surface to be sealed in a trapezoidal contact pattern and are alternately effective to unidirectionally pump leaking fluid upon a reversal of shaft rotation.

A further object of the present invention is to provide a method of making molded bidirectional hydrodynamic shaft seals by forming the air side mold face of the seal cavity with a plurality of ground recesses which establish on the molded seal a plurality of wedge-shaped, cylindrical segments having end portions adapted to contact the shaft in a trapezoidal contact pattern so as to be effective to unidirectionally return fluid leaking past the seal lip regardless of the direction of shaft rotation.

These and other objects will be apparent to one skilled in the art upon reading the following detailed description, reference being made to the accompanying drawings in which:

FIG. 1 is a radially sectioned view of a seal mold for making bidirectional hydrodynamic shaft seals in accordance with the present invention;

FIG. 2 is an enlarged view showing the grinding of the air side mold insert to form a bidirectional molding pattern;

FIG. 3 is a view taken along line 3—3 of FIG. 2;

Figure 4:
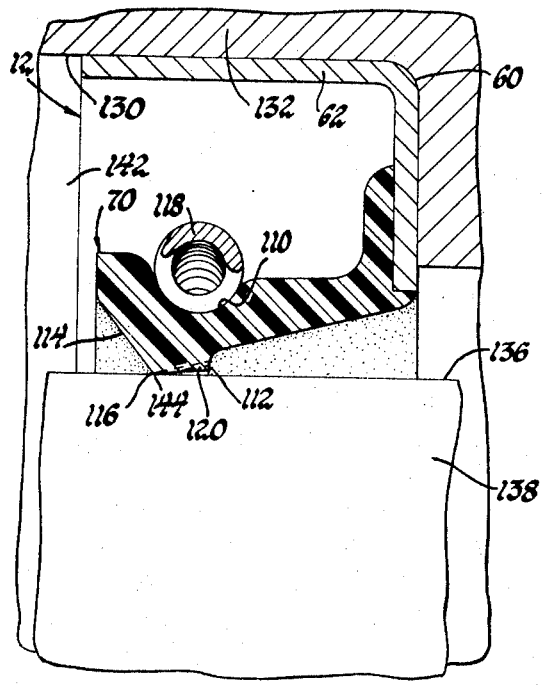
FIG. 4 is a side cross sectional view of a seal installation incorporating a shaft seal, made in accordance with the present invention.
Figure 5:
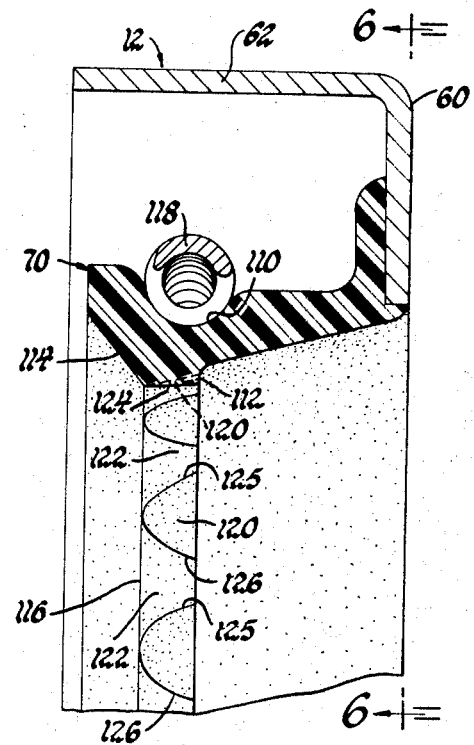
FIG. 5 is a cross sectional view of the bidirectional hydrodynamic shaft seal shown in FIG. 4.
Figure 7:
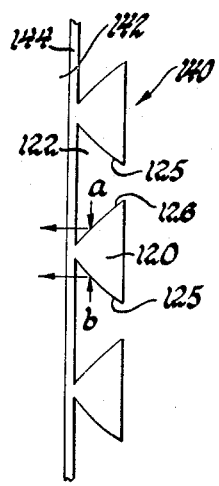
FIG. 7 is an enlarged view of the bidirectional contact pattern between the seal and the shaft.
Figure 6:
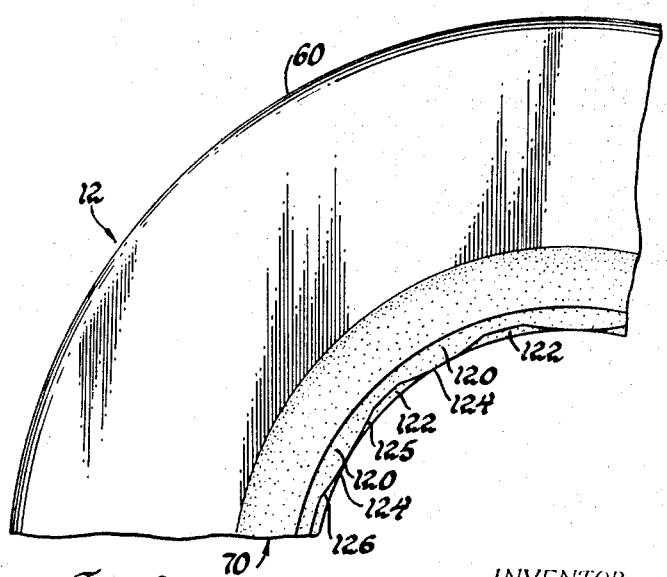
FIG. 6 is a view taken along line 6—6 of FIG. 5.

Referring to the drawings, a seal mold 10 for making a bidirectional hydrodynamic seal 12 comprises a lower mold element 14 and an upper mold element 16 which are relatively axially separable. The lower mold element 14 includes a base 18, an air side insert 20, and a cap member 22. The upper mold element 16 includes a fluid side insert 24 and a sleeve element 26. The seal mold 10 is generally conventional in construction and operation, the unit differing basically in the means for establishing the bidirectional sealing capabilities in the seal 12. In assembly, the above-mentioned elements establish an interior mold cavity conforming in shape to the molded portion of the seal 12.

The base 18 includes annular radial flange 30, a conical face 32, and a circular base 34. The air side insert 20 is in the form of a truncated cone and includes a conical surface 36, a base 38 engaging and coextensive with the base 34, and a circular face 40. The cap member 22 has a bottom surface 42 engaging the face 40 and radially outwardly diverging conical surface 44. The conical surfaces 36 and 44 intersect to form an annular vertex 45.

The fluid side insert 24 includes a conical wall 46 and an axial face 48. The sleeve element 26 includes a cylindrical surface 50 having a radially inwardly projecting annular rib 52 formed thereon. A V-shaped channel 54 is formed between the parting surfaces 56 and 58 of the cap member 22 and the fluid side insert 24, respectively.

Preparatory to the molding of the elastomeric portion of the seal, a metallic seal casing 60, generally L-shaped in cross section, is positioned in the seal mold 10 with a radial flange 62 thereof clamped between the flange 30 and the sleeve element 26 and extending into the mold cavity. Thus, the casing 60 and the mold faces 50, 52, 48, 46, 44, 36, and 32 establish the mold surfaces for forming the elastomeric portion of the seal. By conventional molding techniques, the mold cavity is filled with a suitable elastomer to form a sealing annulus 70 which is integrally bonded at the rim of the flange 62 to form the bidirectional hydrodynamic seal 12. The excess elastomer or flash in the channel 54 is removed in a subsequent trimming operation.

More specifically, the conical surface or mold face 36 of the air side insert 20 is formed with a circumferentially alternating series of recesses 80 and lands 82, the latter being, in effect, a continuation of the conical surface 36. The recesses 80, as shown in FIGS. 2 and 3, are formed by passing cylindrical grinding wheel 84 across the surface 36. More particularly, the air side insert 20 is mounted on a shaft 86 for rotation about an axis 88. The grinding wheel 84 is mounted on a shaft 90 for rotation about an axis 92. The axis 92 lies in a common plane with the axis 88 and, as illustrated, converges toward the latter at a shallow angle A which is less than conical angle B between the surface 36 and the axis 88. Preferably, the angle A is less than 5° and may, if desirable, be parallel to or reversely inclined with respect to the axis 88. The angle B generally should be greater than 15°.

To form a representative recess 80, the cylindrical surface 85 of the grinding wheel 84 is passed across the surface 36 to a predetermined depth at which the tip of the recess 80 intersects the front face 40. For each subsequent recess 80, the air side insert 20 is circumferentially indexed and the above grinding process repeated until the desired number of recesses 80 are formed about the circumference of the surface 36. The recess 80, thus formed, will include a wedge-shaped, cylindrical face 100 bounded by arcuate walls 102, adjacent pairs of which establish generally triangular tips 104.

Referring to FIGS. 4 through 7, a bidirectional hydrodynamic seal 12, made in accordance with the above-described method, comprises the elastomeric sealing annulus 70 including a spring groove 110 formed by the rib 52, an air side wall 112, and a fluid side wall 114 formed by converging frustoconical surfaces. The air side wall 112 and the fluid side wall 114 intersect at a radially inwardly facing circumferential seal lip 116 formed by the vertex 45. A helically coiled garter spring 118 is retained in the groove 110 for radially inwardly biasing the sealing annulus 70. The spring 118 is located to the right of the seal lip 116 so as to exert a maximum lip pressure to the right or air side of the latter.

The above bidirectional hydrodynamic seal 12 also includes a plurality of radially inwardly projecting pads 120 evenly circumferentially about the air side wall 112 which corresponds to the recesses 80. The pads 120 are mutually separated by grooves 122 corresponding to the lands 82. Each pad 120 is in the form of a cylindrical segment, as defined by a cylindrical face 124 bounded by converging arcuate walled surfaces 125 and 126 at the intersection with the grooves 122. The pads 120 have a gradually increasing height in a direction away from the seal lip 116 and an angle of convergence with respect to the seal axis which is shallower or less than the angle of the wall 112. The relieved area between adjacent walled surfaces 125 and 126 constitutes a continuation of the wall 112 and defines the generally triangular or V-shaped form of grooves 122.

As shown in FIG. 4, the casing 60 is mounted in a bore 130 of a housing 132 with the pads and the seal lip 116 engaging the outer cylindrical surface 136 of the shaft 138. The bases of the pads 120 contact surface 136 with the walled surfaces 125 and 126 and form a generally trapezoidal contact pattern 140, FIG. 7. The seal lip 116 establishes a continuous circumferential contact with the surface 136. The fluid reservoir 142 is to the left of the static sealing surface 144 established between the seal lip 116 and the surface 136. As the shaft rotates in one direction fluid particle $a$, which has leaked past the surface 144, is carried along the shaft surface within the grooves 122 until it impinges against the walled surface 126. The inclination of the surface 126 causes fluid to be pumped past the surface 144 to the reservoir 142. For the opposite direction of a shaft rotation, a fluid particle $b$ impinges against walled surface 125 and is pumped from right to left past the sealing surface 144 to the reservoir 142.

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. A method of making a seal mold for bidirectional hydrodynamic shaft seals, comprising the steps of: forming an annular cavity in said seal mold having radially inwardly converging frustoconical walls intersecting at an annular vertex; and grinding a uniform series of evenly circumferentially spaced concave cylindrical recesses tangentially in one of said frustoconical walls at an angle of inclination less than the conical angle of said wall, said recesses having axes intersecting the axis of said annular cavity and being defined by converging arcuate sides, said recesses being formed to a depth such that said arcuate sides converge and intersect at said annular vertex with adjacent recesses being mutually separated by conical lands formed by said one of said frustoconical walls whereby the molded shaft seal is formed with a plurality of circumferentially spaced, wedge-shaped convex pads defined by cylindrical faces corresponding to said recesses bounded by arcuate walled surfaces corresponding to said arcuate sides and separated by conical grooves corresponding to said lands, the portions of said arcuate walled surfaces adjacent said vertex being adapted to engage the shaft in a trapezoidal contact pattern such that the opposite walled surfaces are alternately effective to unidirectionally pump leaking fluid upon a reversal of shaft rotation.

* * * * *